A. COPONY.

CONSTRUCTION FOR LOADING AUTOMOBILES IN FREIGHT CARS.

APPLICATION FILED MAR. 22, 1920.

Reissued Dec. 5, 1922.

15,500.

2 SHEETS—SHEET 1.

Inventor.
Alfred Copony.
Emery, Booth, Janney & Varney.
Attys.

A. COPONY.
CONSTRUCTION FOR LOADING AUTOMOBILES IN FREIGHT CARS.
APPLICATION FILED MAR. 22, 1920.
Reissued Dec. 5, 1922.
15,500.
2 SHEETS—SHEET 2.
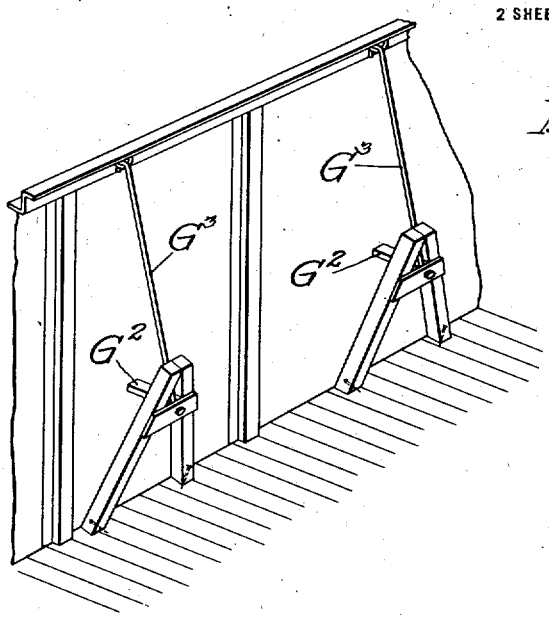
Fig. 3.
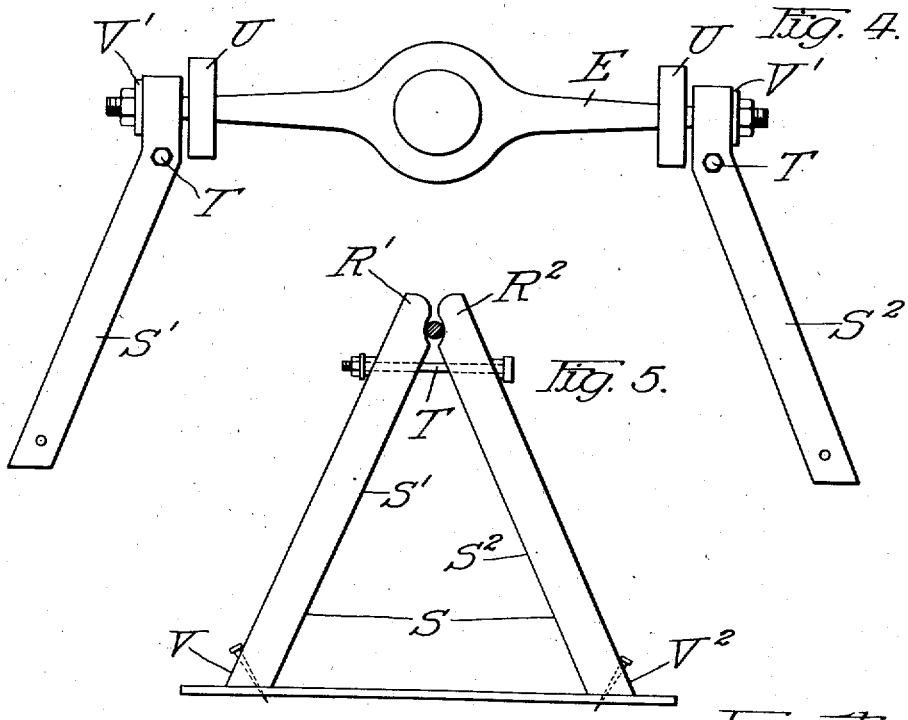
Fig. 4.
Fig. 5.
Inventor.
Alfred Copony.
Emery, Booth, Janney & Varney.
Attys.

Reissued Dec. 5, 1922. Re. 15,500

UNITED STATES PATENT OFFICE.

ALFRED COPONY, OF DETROIT, MICHIGAN, ASSIGNOR, BY DIRECT AND MESNE ASSIGNMENTS, TO COPONY AUTO-LOADING COMPANY, A CORPORATION OF MICHIGAN.

CONSTRUCTION FOR LOADING AUTOMOBILES IN FREIGHT CARS.

Original No. 1,186,553, dated June 13, 1916, Serial No. 90,086, filed April 10, 1916. Reissue No. 14,335, dated July 31, 1917, Serial No. 176,438, filed June 22, 1917. This application for reissue filed March 22, 1920. Serial No. 367,898.

*To all whom it may concern:*

Be it known that I, ALFRED COPONY, a citizen of the Austrian Republic, residing at Detroit, in the county of Wayne and State of Michigan, have invented certain new and useful Improvements in Constructions for Loading Automobiles in Freight Cars, of which the following is a specification, reference being had herein to the accompanying drawings.

This invention relates to automobile freight cars and refers more particularly to a new and improved construction for loading automobiles in freight cars, the automobiles being placed one above another.

The salient objects of the invention are to provide a construction whereby two tiers of automobiles can be conveniently located in cars having such a small clearance that the present methods of loading will only permit one layer of automobiles to be loaded therein; to provide a simple and rigid construction in which the suspension elements for the automobiles are rigidly braced by triangular braces in two or more planes; to provide a construction in which the triangular bracing above referred to can be utilized and the apex of at least one of the triangles changed in position so as to adjust the automobile upward; to provide means for making this adjustment after the automobile is in place upon the suspension means, thus allowing a block and tackle to be used for raising the automobile toward the car roof and permitting the automobile to be lowered sufficiently to give clearance in removing the block and tackle; to provide means for suspending automobiles in either metal or wooden cars and in general to provide an improved and simplified construction of the character referred to.

The invention further resides in such features of construction and arrangements and combinations of parts as will more fully hereinafter appear.

In the drawings:

Fig. 3 is a fragmentary perspective view showing a slightly modified construction of suspension member;

Fig. 4 is an end elevation of a still further modification;

Fig. 5 is a transverse view of the supporting member shown in Fig. 4.

Figure 1:
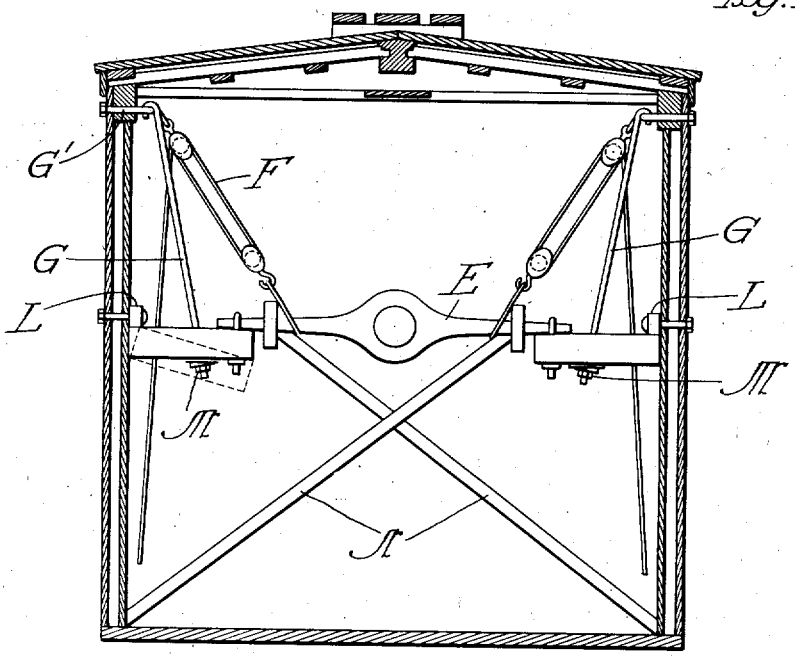
Figure 1 is a cross section of a freight car showing the manner of suspending the automobile.
Figure 2:
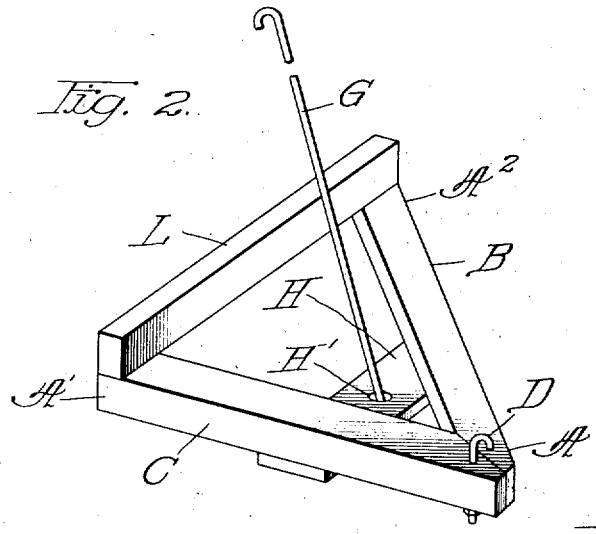
Fig. 2 is a perspective view of one of the suspension members shown in Fig. 1.

In loading automobiles in freight cars having a relatively small clearance, difficulty has been encountered in getting more than one layer of automobiles into the freight car. Where the automobiles are raised by a block and tackle it is customary to permit the automobile to drop back a sufficient amount to permit the removal of the block and tackle. The present invention contemplates an arrangement whereby the automobile after being lowered to permit of the removal of the block and tackle can be adjusted upward toward the roof so as to permit of a second automobile being placed beneath the suspended one. In suspending the automobile it is necessary to provide very rigid support and one that is properly braced. In the construction shown in Figs. 1 and 2 I have employed a novel arrangement wherein a triangular suspension member A having sides B and C is provided with a U bolt D adapted to be clamped over the axle E of the automobile. There is of course a pair of these suspension members for both the front and rear axles of the automobiles. The block and tackle arrangement F is employed for raising the automobile up toward the roof of the freight car and when so positioned the suspension members are attached as follows. The upper ends of the rods G are hooked into the eye bolts G′ and the lower end of the rod extended through a hole H′ in the cross bar H of the triangular brace A.

Secured to the side wall of the freight car is a cross brace L, there being one of these cross braces for each triangular brace and the ends A′ and $A^2$ of the triangular brace extend under the brace L. The nut M is then tightened up on the rod G sufficiently to hold the triangular brace in the position shown in dotted lines in Fig. 1. In removing the block and tackle an X-shaped support N bearing against the brake band housing and resting on the floor of the car may be employed for holding the automobile temporarily. The nut M is then tightened up on the threaded end of the rod G until each of the triangular braces have been raised to the position shown in full lines in Fig. 1. The arrangement of the triangular brace and the supporting rod G which is connected to the cross bar H gives a triangular bracing effect in both vertical and horizontal planes so that the automobile when once suspended, is rigidly braced in both directions.

In the construction shown in Fig. 3 the lower ends of the main triangular brace are toe-nailed to the floor of the car and an auxiliary brace run from the head of the triangular or A-brace to the side of the car. This construction is particularly adapted for use where the side of the car is formed of steel plates which would not permit the nailing of supports for the A-braces directly to the side of the car. A rod $G^3$ similar to the rod G is employed in this construction, and the end of the auxiliary brace $G^2$ rests against the car side. Thus the same advantages of triangular bracing in a plurality of planes and adjustment to raise the apex or supporting part of the triangle after the automobile is in position, is permitted.

In the modification shown in Figs. 4 and 5 the supporting rods are omitted and the ends R′ and $R^2$ of the sides S′ and $S^2$ of the triangular brace S form a direct connection to the axle. A transverse bolt T extends through the sides S′ and $S^2$ and can be tightened up to securely lock the ends in bracing position between the brake bands U of the automobile and a large washer V′ temporarily placed in the axle. Where this construction is employed the lower end V of one of the sides of the triangle is first toe-nailed to the floor and then the other sides shoved over toward it until the automobile is raised as far as possible toward the ceiling. The end $V^2$ of the side $S^2$ is then nailed to the floor and the nut on the bolt T tightened up so that the automobile will be securely locked from movement in either direction.

Moreover in all cases there is sufficient clearance left beneath the upper automobile to hold a second one even with cars having as small a clearance as eight and one-half feet.

It will be seen that the several illustrative constructions shown in the patent drawings comprise what may be termed truss structures in opposite sides of the car for suspending an automobile therebetween clear of space for a subjacent automobile, and more particularly, in the forms illustrated, for suspending the upper automobile from its axles while firmly bracing the same longitudinally and crosswise of the car. Each of these structures, in the specific forms illustrated, comprises an A-brace disposed to brace the axle longitudinally and transversely, and cooperating means transverse of the plane of the A-brace for maintaining the same in supporting and bracing position, e. g., the inclined suspension rods G in Fig. 1, where the A-braces are disposed horizontally with their legs or struts diverging from the supported axles to the adjacent side wall of the car; or the transverse struts $G^2$ in Fig. 3, where the A-braces are disposed obliquely to the side walls; or the nuts and temporary washers V′ in Fig. 4 whereby the oppositely inclined A-braces at opposite sides of the car are interconnected through the automobile axle to resist side thrust. In each of these structures the elements which transmit the vertical load of the suspended automobile to the car body, viz, the suspension rods G in Fig. 1 and the legs or struts of the A-braces themselves in Figs. 3 and 4, are inclined to the side walls of the car, being thus clear of the intervening automobile space between opposite supporting and bracing structures as well as contributing importantly to the transverse bracing effect.

While I have shown and described various embodiments of my invention it is obvious that numerous changes can be made in the details of construction without departing from the scope of my invention. I therefore do not desire to limit the latter except as specified in the appended claims.

What I claim as my invention is:

1. The combination with a freight car, of means for suspending an automobile therein, comprising a triangular brace member forming a triangular brace in both vertical and horizontal planes, and means for raising the apex of one of the triangles after the automobile is in place.

2. The combination with a freight car, of means for suspending an automobile therein, comprising a suspension member having a triangular portion, means for securing the automobile to the triangle and means for raising that portion of the triangle toward the roof of the car while the automobile is supported on the suspension member.

3. The combination with a freight car, of means for suspending an automobile therein to provide clearance for a second automobile beneath the first, said means comprising a triangular brace member and means for changing the position of the triangle to adjust the automobile toward the roof of the car.

4. The combination with a freight car, of means for suspending an automobile therein to provide clearance for a second automobile beneath the first, said means comprising a brace cooperating with the side of the car, said brace member having a portion projecting in a vertical plane and a portion projecting in a horizontal plane.

5. The combination with a freight car, of means for supporting and bracing an automobile therein to provide clearance for a second automobile beneath the first, said means comprising in each side of the car supporting and bracing elements located clear of an intervening automobile space and cooperating with each other and with the car body to provide elevated supports for the upper automobile clear of the space for the lower automobile and to form a triangular brace in both vertical and horizontal planes.

6. The combination with a freight car, of means for supporting and bracing an automobile therein to provide clearance for a second automobile beneath the first, said means comprising in each side of the car supporting and bracing elements located clear of an intervening automobile space and cooperating with each other and with the car body to provide triangular braces, clear of the space for the lower automobile, for bracing the upper automobile longitudinally and transversely of the car.

7. The combination with a freight car, of means in opposite sides of the freight car for supporting an automobile therebetween to provide clearance for a second automobile beneath the first, comprising triangular brace members located clear of the space for the lower automobile and forming triangular braces in both vertical and horizontal planes.

8. The combination of a freight car, of means for suspending an automobile therein to provide clearance for a second automobile beneath the first, comprising triangular bracing and supporting means in opposite sides of the car located clear of the space for the lower automobile and constructed and arranged to support the axles of the upper automobile while bracing the same longitudinally and transversely of the car.

9. The combination with a freight car, of means in opposite sides of the freight car for supporting an automobile therebetween to provide clearance for a second automobile beneath the first, comprising brace members cooperating with the sides of the car having portions projecting in horizontal and vertical planes, the space for one of the automobiles being enclosed between the portions of said brace members which transmit the vertical load to the car body.

10. The combination with a freight car, of means for suspending an automobile therein to provide clearance for a second automobile beneath the first, comprising truss structures cooperating with the car body at opposite sides of an intermediate automobile space to provide elevated supports for the upper automobile braced longitudinally and crosswise of the car, said structures having divergent bracing struts and other stress-sustaining elements disposed transversely of the planes of said struts.

11. The combination with a freight car, of means for supporting an automobile therein to provide clearance for a second automobile beneath the first, comprising truss structures cooperating with the side walls of the car; said structures providing supports for the upper automobile braced longitudinally and crosswise of the car.

12. The combination with a freight car, of means for suspending an automobile therein to provide clearance for a second automobile beneath the first, comprising truss structures cooperating with the car body at opposite sides of an intermediate automobile space to provide elevated supports for the upper automobile braced longitudinally and crosswise of the car.

13. The combination with a freight car, of truss structures in opposite sides of the car for supporting an automobile therebetween with clearance for a second automobile beneath the first, said structures forming triangular braces for bracing the automobile longitudinally and transversely of the car.

14. The combination with a freight car, of means for suspending an automobile therein to provide clearance for a second automobile beneath the first, comprising truss structures in opposite sides of the car cooperating with each other to support the upper automobile and cooperating with the side walls of the car to resist side thrust, said structures having struts disposed to provide bracing longitudinally of the car and cooperating stress-sustaining elements disposed transversely of the planes of said struts.

15. The combination with a freight car, of truss structures in opposite sides of the car for supporting an automobile therebetween with clearance for a second automobile beneath the first; said structures comprising elements inclined to the side walls of the car for transmitting the vertical load of the upper automobile to the car body, and cooperating transverse elements adapted to resist side thrust; certain of said elements comprising divergent struts to provide bracing longitudinally of the car.

16. In a system for supporting automobiles one above another in a freight car, side supports for the upper automobile clear of the space for the lower automobile, comprising supporting and bracing elements disposed in two planes relative to adjacent side walls and disposed to brace the upper automobile longitudinally and transversely of the car.

17. In a system for supporting automobiles one above another in a freight car, a brace cooperating with the car body to provide an elevated side support for the upper automobile clear of the lower automobile, said brace having portions projecting in different planes relative to an adjacent side wall of the car to brace said automobile against movement in both vertical and horizontal planes.

18. The combination with a freight car, of means for supporting an automobile therein to provide clearance for a second automobile beneath the first, comprising in each side of the car supporting and bracing elements diverging from a common supporting point toward an adjacent side wall in three directions to separate anchorages upon the car body to transmit thrusts in vertical, longitudinal and transverse directions.

19. The combination with a freight car, of means for supporting an automobile therein to provide clearance for a second automobile beneath the first, comprising in each side of the car supporting and bracing elements cooperating with each other and the car body to support the upper automobile by its axles and provide diagonal bracing therefor disposed to brace the upper automobile longitudinally and transversely of the car.

20. The combination with a freight car, of means for supporting an automobile therein to provide clearance for a second automobile beneath the first, comprising in each side of the car supporting and bracing elements cooperating with each other and the car body to support the upper automobile and provide bracing therefor, said elements including divergent struts disposed obliquely to the side walls for bracing the upper automobile both longitudinally and transversely of the car.

21. The combination with a freight car, of means for suspending an automobile therein to provide clearance for a second automobile beneath the first, comprising tripodal structures cooperating with the car body at opposite sides of an intermediate automobile space for supporting the axles of the upper automobile while bracing them longitudinally and transversely of the car.

22. The combination with a freight car, of means for suspending an automobile therein to provide clearance for a second automobile beneath the first, comprising inwardly projecting structures at opposite sides of the car for supporting the axles of the upper automobile and bracing said axles longitudinally and crosswise of the car; said structures composed of A-braces and members cooperating therewith transversely of the planes of the A-braces; the elements of said structures which transmit the vertical load to the car body being inclined to the adjacent side walls of the car and outside of the automobile space between opposite structures.

23. The combination with a freight car, of means for suspending an automobile therein to provide clearance for a second automobile beneath the first, comprising A-braces between the upper automobile axles and car at each side of the car, disposed to brace said axles longitudinally of the car, and cooperating members for sustaining stress transversely of the planes of the A-braces; said A-braces and members composing structures for supporting said axles and bracing the same crosswise as well as longitudinally of the car; the elements of said structures which transmit the vertical load to the car body being inclined to the adjacent side walls of the car and arranged outside of the automobile space between the structures at opposite sides of the car.

24. The combination with a freight car, of means for suspending an automobile therein to provide clearance for a second automobile beneath the first, comprising A-braces at opposite sides of the car and cooperating means maintaining said braces in position to support the axles of the upper automobile and to brace the same longitudinally and crosswise of the car; there being clear space for an automobile body above and below the supporting vertices of the A-braces.

25. The combination with a freight car, of means for suspending an automobile therein to provide clearance for a second automobile beneath the first, comprising inclined load sustaining elements at opposite sides of the car and transverse bracing elements cooperating to support the axles of the upper automobile and brace the same longitudinally and crosswise of the car; certain elements disposed in planes transverse of other elements forming A-braces.

ALFRED COPONY.